Jan. 23, 1940.   C. H. TYLER   2,187,991
SINKER
Filed Oct. 29, 1938

C. H. Tyler
INVENTOR.
BY *CA Snow & Co.*
ATTORNEYS.

Patented Jan. 23, 1940

2,187,991

UNITED STATES PATENT OFFICE 2,187,991

SINKER

Clarence H. Tyler, Evansville, Ind.

Application October 29, 1938, Serial No. 237,725

1 Claim. (Cl. 43—52)

This invention relates to sinkers designed for use on fishing lines, the primary object of the invention being to provide a sinker which will strike the water with appreciably less splash than the sinkers of known construction, and because of the specific construction, the sinker will lie flat on the bottom of the body of water, and will not roll under the influence of the current or flow of water thereover.

Another important object of the invention is to provide a sinker which will have a tendency to ride over obstructions on the surface on which the sinker is resting, thereby insuring against the sinker becoming caught or tangled when the fishing line on which the sinker is secured, is being reeled in.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spiirt of the invention.

Referring to the drawing.

Figure 1:
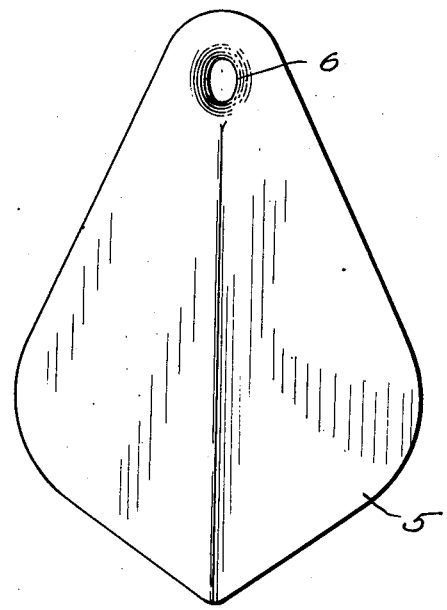
Figure 1 is an elevational view of a sinker constructed in accordance with the invention.

Referring to the drawing in detail, the fishing line sinker comprises a body portion 5 of heavy material, preferably lead, which is substantially pear shaped in side elevation, or elongated in the direction of the line of pull when in use, the forward or narrow end of the pear shaped body portion being formed with an opening 6, through which the fishing line is extended and secured to the sinker.

As shown, the side surfaces of the body portion are gradually beveled towards the narrow or forward end thereof, providing a structure which is substantially thick adjacent to the wide end of the body portion, and since the major portion of the weight of the sinker is disposed rearwardly of the center of the sinker, it will be obvious that when the sinker is being pulled through the water, the forward end of the sinker will have a tendency to rise or swing upwardly and ride over obstructions which may be present on the surface over which the sinker moves.

Figure 4:
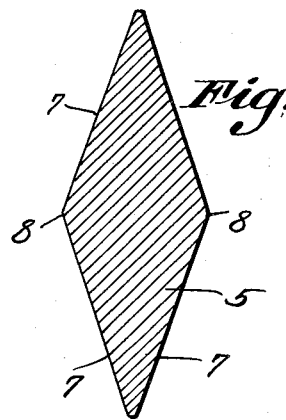
Figure 4 is a sectional view taken on line 4—4 of Figure 2.

It will also be seen that the sinker is provided with sloping or beveled side surfaces 7, which slope from a line extending longitudinally of the body portion, towards the outer side edges of the body portion as shown by Figure 4 of the drawing, with the result that when the sinker is sliding over a surface or bottom of a body of water, the edges 8 of the sinker will act as runners to insure a free movement of the sinker over the bottom.

Figure 2:
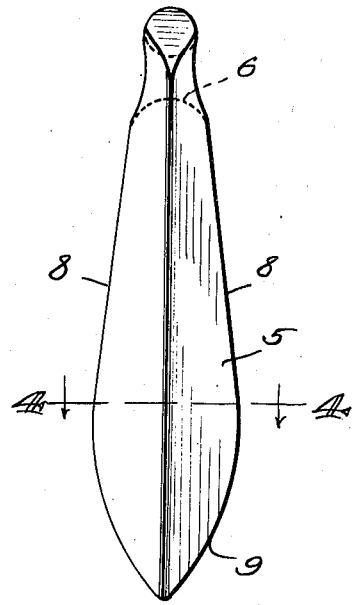
Figure 2 is an edge elevational view thereof.
Figure 3:
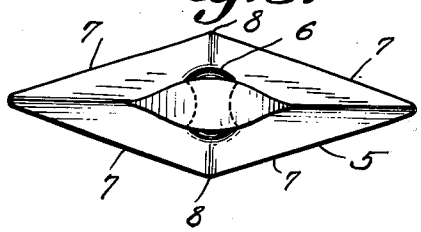
Figure 3 is an end elevational view of the sinker.

The body portion also slopes from a line near the rear end of the sinker, to the rear edge thereof as shown by Figure 2, providing a curved surface 9 on which the sinker may rest, when the front edge of the sinker is elevated, just prior to the sinker leaving the bottom of the body of water.

With the foregoing it will be seen that due to the particular shape of the sinker, the sinker will rest flat on the bottom of the body of water, and will not be affected by the water currents, and because the sinker is substantially flat, it will be impossible for the sinker to roll.

It will also be seen that when the sinker is being reeled in the forward end of the sinker will be constantly moved upwardly and downwardly, causing the same to free itself of any obstructions such as branches or twigs, stones or the like with which it may come in contact.

What is claimed is:

A sinker for fishing lines, comprising a substantially pear shaped body portion providing a wide portion near the rear end thereof, the wide portion being substantially thick at the center thereof, the surfaces of the wide portion being beveled to the outer rear and forward edges of the body portion, and the rear edge of the body portion being curved.

CLARENCE H. TYLER.